Feb. 20, 1962 A. A. STRIPLING 3,022,488
DELAYED ACOUSTIC VELOCITY SIGNAL TRANSMISSION
Filed Feb. 17, 1958 2 Sheets-Sheet 1

ALLEN A. STRIPLING
INVENTOR.

BY *signature*

ATTORNEY

Feb. 20, 1962    A. A. STRIPLING    3,022,488
DELAYED ACOUSTIC VELOCITY SIGNAL TRANSMISSION
Filed Feb. 17, 1958    2 Sheets-Sheet 2

ALLEN A. STRIPLING
INVENTOR.

BY *[signature]*
ATTORNEY

United States Patent Office 3,022,488
Patented Feb. 20, 1962

3,022,488
DELAYED ACOUSTIC VELOCITY SIGNAL
TRANSMISSION
Allen A. Stripling, Dallas, Tex., assignor, by mesne assignments, to Socony Mobil Oil Company, Inc., New York, N.Y., a corporation of New York
Filed Feb. 17, 1958, Ser. No. 715,818
9 Claims. (Cl. 340—15)

This invention relates to well logging and more particularly to the transmission of time separated signals from points in a well bore to surface measuring equipment. In a more specific aspect, the invention relates to selectively altering the time separation between closely spaced acoustic pulses in order to permit selective circuit action in the interval between such pulses.

Acoustic velocity well logs are highly useful in providing data to aid in the interpretation of seismic records. In addition, velocity logs yield valuable information as to the character of the formations through which the data were obtained and thus provide a basis for correlating acoustic structural features encountered in well bores drilled substantial distances apart in attempts to locate and produce oil and gas.

It has been found desirable to detect acoustic pulses traveling through formations adjacent a borehole at two closely spaced points. The spacing may be such that the detected signals often persist for periods greater than the interval between each acoustic pulse at the two detecting locations. Where measurement of the time interval between such pulses is undertaken with instrumentation located at the mouth of the well bore, the transmission of the separate signals to the earth's surface over cables generally employed in well logging operations has been found difficult. It is an object of the present invention to provide a mode of operation and to provide a system for assuring precise delivery to the earth's surface and to utilize at least two signals over the same signal channel in such form as readily would be distinguishable one from the other thereby to permit measurement of the time interval between such signals.

More particularly, there is provided a well logging system where electrical signals, spaced in time corresponding with the appearance of the signals at two spaced points in a well bore, are to be transmitted to the earth's surface for measurement of the time interval therebetween. Measuring means at the earth's surface is provided to determine the time interval between signals applied to the input thereof. A signal channel connected to the input of the measuring means extends into the well bore and is terminated in a control means which includes a first circuit for applying a first of the signals to the signal channel and a second circuit. Switching means responsive to a signal from the signal channel is provided for actuating the control means to disrupt the first circuit and to apply the second of the signals to the signal channel through the second circuit. Said second circuit means includes means for delaying transit of the second of said signals to the signal channel for a time interval of predetermined length which interval is greater than the time required for the actuation of the control means. There is thus assured transmission of the second signal to the measuring means independent of and distinct from the first signal.

In accordance with a further aspect of the invention, the measuring means is adapted to introduce a function with respect to the first of the signals which will compensate for the introduction of the time delay in the second downhole circuit of predetermined length.

In one embodiment of the invention, the second signal is passed through a time delay unit downhole and the first signal is passed through a similar time delay unit at the surface so that the signals delivered to the measuring means bear the same relationship one to the other as the appearance of the acoustic signals at two points of detection downhole.

In accordance with a further embodiment of the invention, the second signal is passed through a time delay means downhole and a compensating function is introduced in the recording of the resultant time measurement to reduce the time measurement by an amount directly proportional to the time delay introduced in the second signal.

For a more complete understanding of the present invention and for further objects and advantages thereof, reference may now be had to the following description taken in conjunction with the accompanying drawings in which:

FIG. 1 is a diagrammatic representation of the invention;

FIG. 2 includes a plurality of graphs showing the relationship of signals appearing in FIG. 1;

Figure 1:
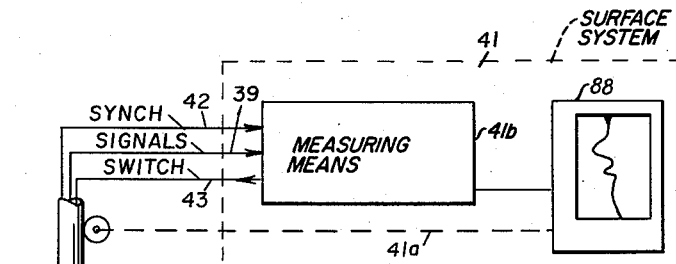

Referring now to FIG. 1, there is illustrated a logging system which includes an exploring unit 10 which is adapted to be moved along the length of a borehole 11. In the form illustrated, the unit 10 includes an acoustic pulse transmitter T from which there depends an acoustic insulating member 12. A first receiver $R_1$ is supported by insulator 12 and in turn supports a second insulator 13. A second receiver $R_2$ is supported by insulator 13.

Figure 2:
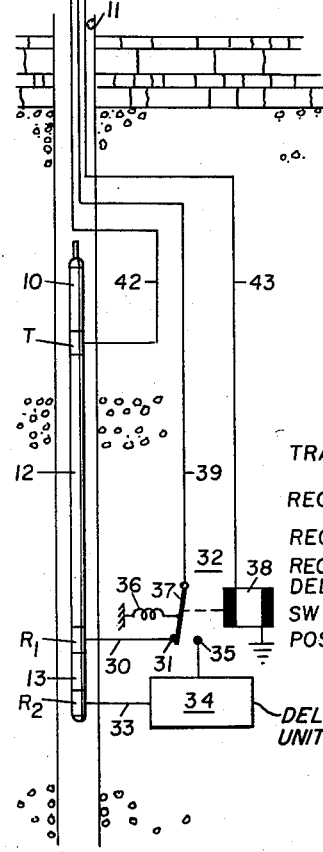
Figure 2:
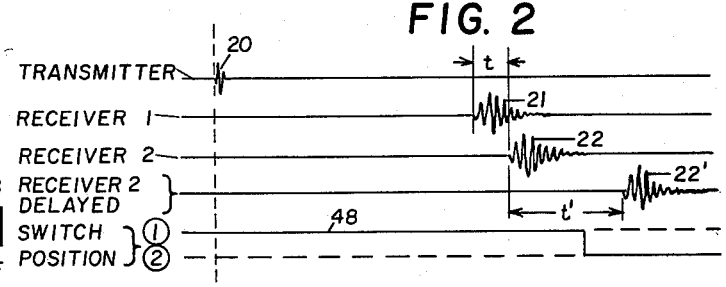

In operation, acoustic pulses diagrammatically represented by a pulse 20, FIG. 2, are periodically produced by transmitter T. The resultant pulses are detected after travel through the formations adjacent borehole 11 to the location of receivers $R_1$ and $R_2$. The output signal or pulse from receiver $R_1$ is plotted in FIG. 2 as waveform 21. The output pulse from receiver $R_2$ is plotted as waveform 22. It will be recognized that a measurement of the time interval $t$ of FIG. 2 will be inversely proportional to the velocity of sound in the portion of the formations between receivers $R_1$ and $R_2$.

It has been found desirable separately to transmit the electrical pulses 21 and 22 to the earth's surface for measurement. At the surface there is then produced a physical representation such as a voltage which varies in magnitude in dependence upon variations in the time interval $t$ and which physical representation may be recorded or tabulated with reference to a scale having the depth of a point of observation as an independent variable.

Cables employed in well logging operations of sufficient strength to support logging instruments at depths of 15,000 feet or more generally are not provided with sufficient insulating or isolating qualities as to permit the transmission of signals 21 and 22 to the earth's surface by way of separate or wholly isolated channels without undue crossfeed between the signals. More particularly, it has been found that where separate signal channels are provided, crossfeed from one channel to another is of such substantial nature as to render measurement at the outputs of such separate channels most difficult.

In accordance with the present invention, applicant provides a mode of operation and a system for separating signals 21 and 22 further in time than they appear at detectors $R_1$ and $R_2$ so that they may be separately transmitted to the earth's surface.

More particularly, receiver $R_1$ is connected by way of channel 30 to a first terminal 31 of a solenoid actuated switch 32. Receiver $R_2$ is connected by way of channel 33 and a time delay network 34 to the second terminal 35 of switch 32. A spring 36 normally biases the armature 37 of switch 32 to contact terminal 31. Upon energization of the relay coil 38, the armature 37 is moved to contact terminal 35 which disrupts the circuit from receiver $R_1$ and establishes a signal channel to the surface from receiver $R_2$. The armature 37 of switch 32 is connected to a signal channel 39 which extends along the length of a borehole and forms a part of a cable 40 and is terminated at one input of a measuring means 41b of the surface system 41. A second channel 42 extends through cable 40 from transmitter T to a second input of the measuring means 41b. A third channel 43 extends through cable 40 from solenoid 38 to the measuring means 41b.

In operation, the generation of an acoustic signal such as signal 20, FIG. 2, is accompanied by the transmission to the measuring means 41b of a synchronizing signal. As will hereinafter be shown, the synchronizing signal serves to preset the measuring means 41b in condition to permit a time measurement between two signal pulses subsequently appearing on channel 39. Thereafter, when the acoustic signal from transmitter T appears at the location of receiver $R_1$, a pulse 21, FIG. 2, is generated and is transmitted by way of signal channel 39 to the signal input of the measuring means 41b. Upon receipt of pulse 21 at the measuring means 41b, there is produced a switching signal which is applied to the channel 43. The measuring means 41b may be considered, in one sense, to be the source of the switching signal which, as applied to the solenoid 38, serves to break the circuit between terminal 31 and armature 37 and establish a circuit between terminal 35 and armature 37.

Since switching action often requires a time interval greater than the time interval $t$, and in order to assure the transmission of pulse 22 to the measuring means 41 independent of and distinct from the pulse 21, applicant has provided a time delay network 34 which delays the passage of the pulse 22 from receiver $R_2$ to terminal 35 a time interval of predetermined length as, for example, time interval $t'$, FIG. 2. As indicated by line graph 48 of FIG. 2, the armature 37 is moved from switch position No. 1 (terminal 31) to switch position No. 2 (terminal 35) during the time interval $t'$. Thereafter, pulse 22', i.e., the delayed pulse 22, is applied by way of channel 39 to the measuring means 41b. Measuring means 41b then utilizes the pulse 21 and the pulse 22' in the manner hereinafter described to produce an output function representative of the time interval $t$.

Figure 3:
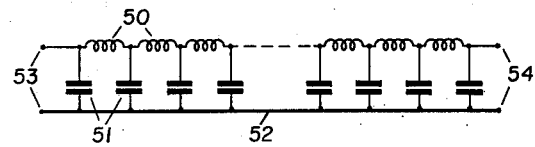
FIG. 3 is a diagram of a time delay unit of FIG. 1.

The delay unit 34 may comprise one of several different signal delaying circuits. A circuit employed in one embodiment of the invention has been illustrated in FIG. 3 and comprises a delay line of lumped electrical impedances. More particularly, the delay line includes a plurality of inductances 50 connected in series with the signal channel. Shunt condensers 51 connected between a common conductor 52 and each juncture between inductances 50 serve to delay the transmission of any signal applied to the input 53 so that a predetermined time will elapse before the appearance of such signal at the output terminals 54.

In one embodiment of the invention a delay line was employed which served to delay transmission of electrical pulses therethrough by a time interval of 200 microseconds. Such a delay line is manufactured and sold by Epsco Incorporated of Boston 15, Massachusetts, the delay line being identified in Bulletin DL-55, July 1, 1955, as one of seven "Custom Designed Delay Lines," the catalog number 0390-20/100. In connection therewith a switch represented by switch 32 was employed having an operating time of about 180 microseconds, thus permitting the establishment of a signal channel from receiver $R_2$ following the appearance of signal 21 and the elimination from the borehole cable circuit of the signal 21 in the interval transmission of signal 22 is desired.

It will be readily recognized that the switch 32 and delay line 34 together with portions of the channels 39, 42 and 43 are illustrated diagrammatically and that all such elements will be housed inside appropriate portions of the unit 10.

The foregoing description has dealt with transmission of signals from unit 10 to the surface measuring system 41 by introducing substantial time delay in the signal from receiver $R_2$. Reference should now be had to the more detailed diagram of FIG. 4 where corresponding elements have been given the same reference characters as in FIG. 1.

There is included in the surface system 41 a delay unit 60 complementary to the downhole delay unit 34 so that the original relationship between pulses 21 and 22 is restored prior to utilization thereof in performing the measurement of the time interval $t$.

Figure 4:
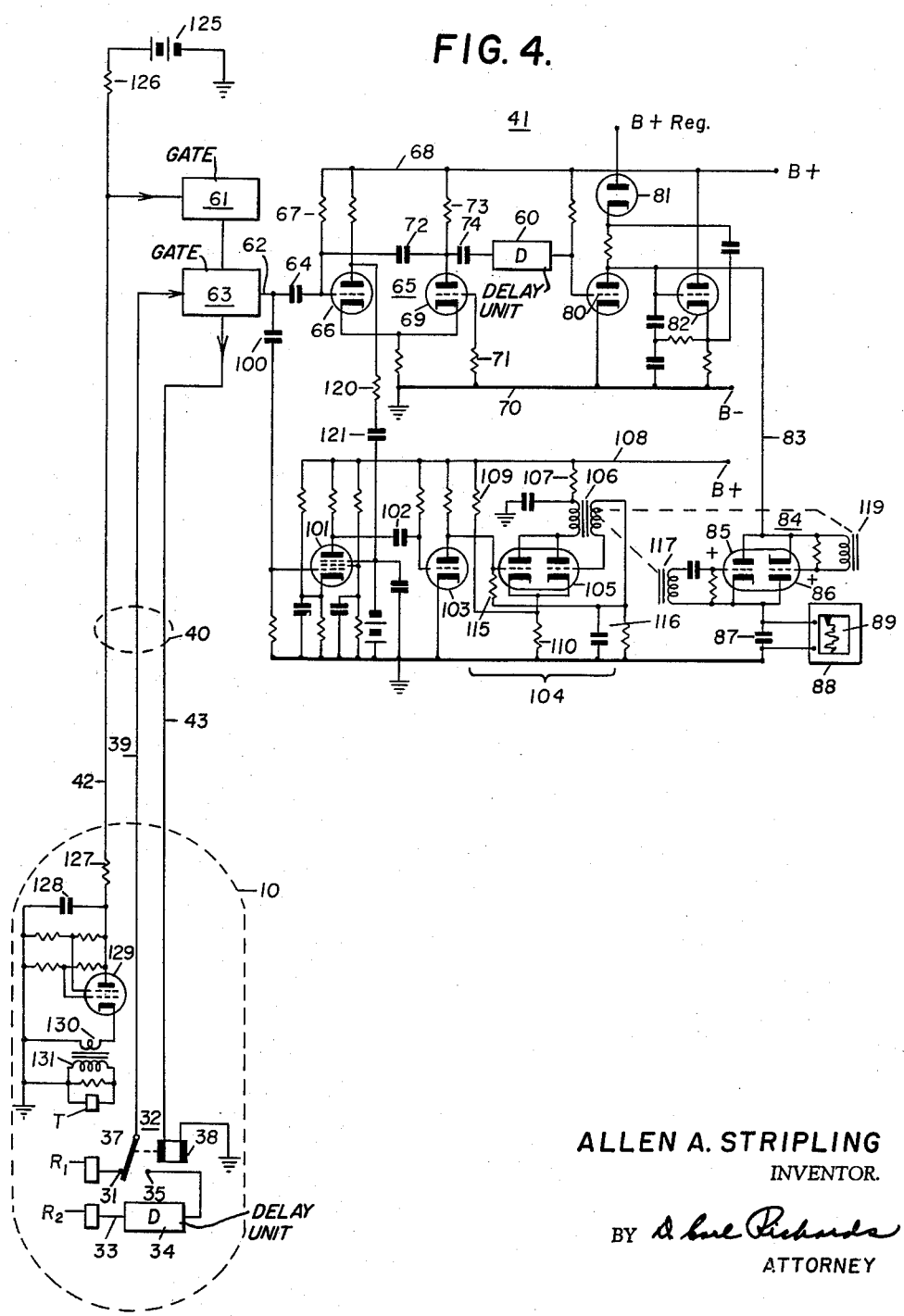
FIG. 4 is a more detailed circuit diagram of the system embodying the present invention.

The surface system 41 illustrated in FIG. 4 is comprised of a gating unit 61 to which there is applied a synchronizing pulse by way of cable channel 42. The output of gating unit 61 is applied by way of channel 62 to a signal gate 63. Signal pulses from switch armature 37 are applied by way of signal channel 39 to the input of signal gate 63. Gate 63 has a first output which is in the form of a switching voltage and is connected by way of channel 43 to the solenoid coil 38 in the borehole unit 10. The signal output channel from signal gate 63 is applied by way of coupling condenser 64 to the input of a circuit 65 commonly termed a "single shot" or "monostable multivibrator." Tube 66 of circuit 65 is normally conductive, its grid being connected by way of resistor 67 to a source of positive potential such as represented by the B+ bus 68. Tube 69 normally is non-conductive. The cathodes of tubes 66 and 69 are connected together and the grid of tube 69 is connected to the ground bus 70 by way of resistor 71. The anode of tube 69 is connected by way of condenser 72 to the control grid of tube 66, by way of plate resistor 73 to the B+ bus 68, and by way of coupling condenser 74 to the delay unit 60. The output of delay unit 60 is applied to the input of a voltage generator circuit which includes tubes 80, 81 and 82. The voltage generator operates to produce a voltage appearing on output conductor 83 which rises linearly from a predetermined value following application to control grid 80 of a trigger pulse. The voltage generator circuit is known in the art as a boot strap linear sweep with compensating network and, together with the control multivibrator circuit 65, is of the type illustrated in the reference "Waveforms," Volume 19, M.I.T. Radiation Series, McGraw-Hill, 1949, at page 277, FIG. 7.23. The linearly rising output voltage appearing on conductor 83 is connected to ground by way of a normally open switch 84 which includes triodes 85 and 86 and a storage condenser 87. In operation of the system thus far described, a timing voltage is generated which is employed by selective momentary closure of the switch 84 to place and maintain a charge on condenser 87 proportional to the time interval $t$ of FIG. 2. Condenser 87 is connected to the input of a chart recorder 88.

As illustrated in FIG. 1, the recorder 88 is coupled by linkage 41a to cable 40 so that the chart 89, FIG. 4, will be driven past the recording element in proportion to the depth of unit 10 in the borehole. The voltage across condenser 87 is then plotted by the recording element in recorder 88 as a varying amplitude function proportional to the time interval $t$.

The normally open switch 84 is selectively closed in accordance with the present invention by the circuit connected to receive the signal output of signal gate 63 by way of condenser 100. A selected pulse transmitted by way of condenser 100 to the control grid of a pentode amplifier tube 101 is amplified and applied by way of coupling condenser 102 to a buffer stage including tube 103. Output signals appearing at the anode of tube 103 are applied to the control input point of a blocking oscillator circuit 104. In the blocking oscillator 104, the anodes of the two triode sections of tube 105 are connected in parallel and by way of the primary winding of a transformer 106 and a load resistor 107 to a B+ bus 108. The cathodes of the triodes are connected together and to a point intermediate resistors 109 and 110 of a voltage dividing network connected between B+ bus 108 and ground. The grids of the triode of tube 105 are connected together by way of a resistor 115 and a secondary winding on transformer 106. The point between resistor 115 and said secondary winding is connected to ground by way of network 116. A second secondary winding 117 is connected in the grid circuit of switch tube 85. A third secondary winding 119 is connected in the grid circuit of switch tube 86. Upon application of a control pulse to the blocking oscillator 104 a voltage having a single cycle operation is induced in secondary windings 117 and 119 momentarily to render the switch 84 conductive. At that instant the voltage appearing on conductor 83 is applied to condenser 87 either to charge the condenser 87 or to discharge it in amount proportional to the difference between the existing voltage across condenser 87 and the voltage appearing between conductor 83 and ground.

It should be noted that the amplifier tube 101 is normally non-conductive being maintained in such condition by a voltage derived from the anode of tube 66 and applied to the suppressor grid of tube 101 by way of resistor 120 and condenser 121.

The operation of the system is as follows. Current flowing from a source such as battery 125 by way of resistor 126, conductor 42 and resistor 127 charges condenser 128. When the voltage across condenser 128 reaches a predetermined level, tube 129 is caused to fire, discharging condenser 128 through a transformer winding 130. Transmitting transducer T, connected in circuit with the secondary winding 131, is thus energized to produce a sharp acoustic pulse for travel to receivers $R_1$ and $R_2$. When tube 129 is energized, the voltage on conductor 42 changes by reason of the voltage drop in resistors 126 and 127. The voltage pulse thus generated is applied to gate 61 to place the latter gate in condition such that it opens gate 63 by application thereto of a control function by way of channel 62. In this condition control gate 63 will transmit to output coupling condensers 64 and 100 and to the cable conductor 43 a signal in response to an input signal. When the acoustic pulse reaches receiver $R_1$, the electrical pulse thus generated is applied through switch 32 and channel 39 to gate 63. The output of gate 63 is then transmitted by way of condenser 64, multivibrator 65, delay circuit 60 to the voltage generator including tubes 80, 81 and 82. By this means initiation of the generation of a timing signal on conductor 83 is delayed by an amount equal to the delay introduced in the signal from receiver $R_2$ by delay circuit 34.

Actuation of multivibrator 65 causes the voltage on the suppressor grid of tube 101 to rise permitting tube 101 to be conductive. Additionally, the output of gate circuit 63 is applied by way of conductor 43 to energize the relay coil 38 to move switch armature 37 to contact 35. Thereafter receipt of the acoustic pulse at receiver $R_2$ causes an electrical pulse to be applied by way of delay circuit 34, terminal 35 and channel 39 to the signal gate 63. Since multivibrator 65 has been actuated by the signal from receiver $R_1$ to its unstable state, the application of the pulse thereto from the receiver $R_2$ will have no effect. However, the latter pulse from receiver $R_2$ is immediately transmitted by way of condenser 100, amplifier 101 and buffer stage 103 to the blocking oscillator 104. Oscillator 104 then momentarily opens switch 84 to apply the voltage on conductor 83 to the condenser 87. Thereafter control unit 61 and multivibrator 65 return to their normal or quiescent state which closes signal gate 63 and renders tube 101 non-conductive. Upon closure of signal gate 63, coil 38 is deenergized and switch armature 37 returns to contact 31 and the system is in readiness for the generation of the second acoustic pulse by transmitter T.

The above cycle of operations is repeated at a relatively low rate as the unit 10 is moved along the borehole to investigate formations through which the borehole extends.

In the modification of the invention shown in FIG. 4, a pulse from receiver $R_1$ is applied directly to the surface system 41. A pulse generated by receiver $R_2$ is then delayed in unit 34 so that it may be transmitted to the measuring system 41 distinct and separate from the pulse from receiver $R_1$. A second delay system 60 is employed in surface system 41 so that the generation of the timing function in response to the pulse from receiver $R_1$ is delayed by an identical amount or by such other amount as may be necessary to introduce desired corrections. By this means the voltage across condenser 87 will represent time required for an acoustic signal to travel over a length of the formation equal to the spacing between receivers $R_1$ and $R_2$.

In accordance with another modification of the invention, the use of the delay system 60 is dispensed with. In the later modification, the circuit is identical with that of FIG. 4 except for the deletion of the delay network 60. In this case the voltage across condenser 87 would be directly proportional to the sum of two time intervals. The first is the time required for transit of an acoustic pulse over the length of borehole represented by the spacing between receivers $R_1$ and $R_2$. The second is the time delay introduced by the delay network 34. The voltage thus appearing across condenser 87 is not directly representative of the travel time which is to be recorded on recorder chart 89. However, since the delay in unit 34 is of constant length, it has been found possible to produce a recording on chart 89 directly representative of the desired transit time and free from the added delay introduced by delay line 34. More particularly, a constant time delay may be represented by a shift in the base line or the zero position of recording element in recorder 88. Thus, in this modification, when delay line 60 is eliminated, the recording element, such as a recording pen in recorder 88, is merely shifted or biased in the proper sense by an amount representative of the delay introduced by delay line 34.

In either of the foregoing modifications of the invention there is introduced a function which compensates for the increase in the time between pulses from receivers $R_1$ and $R_2$ occasioned by the passage of the electrical pulse from receiver $R_2$ through delay unit 34. In one case, a second delay unit 60 is employed. In the other case, a bias function is applied to the recorder 88.

While the invention has been described in connection with certain specific embodiments thereof, it will now be understood that further modifications will suggest themselves to those skilled in the art and it is intended to cover such modifications as fall within the scope of the appended claims.

What is claimed is:

1. In a well logging system where time variant signals corresponding with the time occurrence of acoustic signals at two spaced points in a well bore are to be transmitted to the earth's surface for measurement of the time separation therebetween, the combination which comprises measuring means for determining time separation between signals applied to the input thereof, a signal channel connected to said input and extending into said well bore, control means including a first circuit for applying the first occurring of said time variant signals to said signal channel at the end thereof opposite said measuring means and a second circuit, switching means responsive to a signal from said signal channel for actuating said control means to disrupt the signal channel for said first circuit and for applying the second of said signals to said signal channel through said second circuit, means in said second circuit for delaying transit of said second of said signals to said signal channel for a time interval of predetermined length which is greater than the time required for actuation of said control means to assure transmission of the second of said signals to said measuring means independent of and distinct from the first of said signals, and means in said measuring means for introducing a function to compensate for the increase by the amount of said time interval in said time separation between the signals as applied to said measuring means.

2. In a well logging system having detectors for producing time variant signals in response to a condition at spaced points in a well bore, the combination which comprises measuring means for determining the time separation between signals applied to the input thereof, a signal channel connected to the input of said measuring means and extending into said well bore, means for connecting a first of said detectors to said signal channel, switching means at the end of said signal channel opposite said measuring means responsive to a signal on said channel from the first of said detectors for disconnecting the first of said detectors from said signal channel and for connecting a second of said detectors to said signal channel, means interconnecting the second of said detectors and said switching means for delaying the signal from the second of said detectors for a time interval of predetermined length which is greater than the time required for actuation of said switching means in order to assure the transmission of the signal from the second of said detectors to said measuring means independent of and distinct from the signal from the first of said detectors, and means in said measuring means for introducing a function to compensate for the increase by the amount of said time interval in said time separation between the signals applied to said measuring means.

3. In a well logging system having detectors for producing time variant signals in response to a condition at spaced points in a well bore, the combination which comprises measuring means for determining the time separation between signals applied to the input thereof, a signal channel connected to the input of said measuring means and extending into said well bore, means for connecting a first of said detectors to said signal channel, switching means at the end of said signal channel opposite said measuring means responsive to a signal on said channel from the first of said detectors for disconnecting the first of said detectors from said signal channel and for connecting a second of said detectors to said signal channel, and means in circuit with the second of said detectors for delaying signals therefrom for a time interval sufficient to actuate said switching means, and means interconnecting the second of said detectors and said switching means for delaying the signal from the second of said detectors for a time interval of predetermined length which is greater than the time required for actuation of said switching means in order to assure the transmission of the signal from the second of said detectors to said measuring means independent of and distinct from the signal from the first of said detectors, and delay means in said measuring means for delaying said signal from the first of said detectors a time interval of said predetermined length.

4. In a velocity well logging system in which acoustic pulses are repeatedly generated at a transmitter and detected at receivers spaced different distances from said transmitter for the production of an output function proportional to the time interval between the arrival of said acoustic pulses at said receivers, the combination which comprises a measuring means for producing an output function proportional to the time interval between pulses applied to the input thereof, a signal channel extending from said measuring means into the well bore, a first circuit including a switch at the end of said signal channel opposite said measuring means for connecting the receiver closest to said transmitter to said signal channel, a second circuit interconnecting said switch and the receiver remote from said transmitter, said second circuit including means for delaying the transmission of a signal from the remote receiver to said switch by a predetermined time interval, means responsive to a signal from said signal channel for actuating said switch to disconnect said first circuit and to connect said second circuit to said signal channel in a time interval less than said time interval, and means in said measuring means for compensating predetermined time delay of the signal from said second circuit.

5. In a velocity well logging system in which acoustic pulses are repeatedly generated at a transmitter and detected successively at a first receiver and at a second receiver spaced farther than said first receiver from said transmitter for the production of an output function proportional to the time interval between the arrival of said acoustic pulses at the receivers, the combination which comprises a measuring means for producing an output function proportional to the time interval between pulses applied to the input thereof, a signal channel extending from said measuring means into a well bore, a first circuit including a switch at the end of said signal channel opposite said measuring means for connecting said first receiver to said signal channel, a second circuit interconnecting said switch and said second receiver, said second circuit including means for delaying the transmission of a signal from said second receiver to said switch a predetermined time interval, means responsive to a signal from said signal channel for actuating said switch to disconnect said first circuit and to connect said second circuit to said signal channel in a time interval less than said predetermined time interval, and means in said measuring means for delaying transit of the signal from said first receiver said predetermined time interval.

6. In a well logging system of the type in which first and second receivers are spaced along the length of a borehole and are connected by an electric circuit to a utilization system and in which first and second electric signals produced respectively by the spaced first and second receivers in response to the arrival of an acoustic pulse from a transmitter spaced from and to one side of both receivers are applied to the utilization system, and further in which a control circuit means operatively associated with said electric circuit and responsive to the production of one of the electric signals by one of the receivers attenuates that portion of the electric signal from the first receiver which is closer the transmitter following response by said control circuit means, the improvement comprising circuit means connected to said second receiver for delaying transit of the second electric signal to said electric circuit for a time interval of predetermined length which length is greater than the time required for the actuation of said control circuit means thereby to assure transmission of the second electric signal to said utilization system independent of and distinct from the first electric signal.

7. In a well logging system of the type in which first and second receivers are spaced along the length of a borehole and are connected by an electric circuit to a utilization system and in which first and second electric signals produced respectively by the spaced first and second receivers in response to the arrival of an acoustic pulse from a transmitter spaced from and to one side of both receivers are applied to the utilization system, and further in which a switching means operatively associated with said electric circuit and responsive to the production of one of the electric signals by one of the receivers disconnects the first receiver which is closer the transmitter from said electric circuit, the improvement comprising means interconnecting the second receiver and said electric circuit for delaying the electric signal from said second receiver for a time interval of predetermined length which is greater than the time required for actuation of said switching means in order to assure the transmission of the electric signal from the second of said receivers to said utilization system independent of and distinct from the electric signal from said first receiver.

8. In a well logging system of the type in which spaced receivers are connected by an electric circuit to a time interval measuring means and in which electric signals produced by the spaced first and second receivers in response to the arrival of an acoustic pulse from a transmitter spaced from the receivers are applied to the time interval measuring means, and further in which a switching means operatively associated with said electric circuit and responsive to the production of an electric signal by the first receiver which is closer the transmitter disconnects that receiver from said electric circuit, the improvement comprising means interconnecting said second receiver and said electric circuit for delaying the signal from said second receiver for a time interval of predetermined length which is greater than the time required for actuation of said switching means in order to assure the transmission of the signal from said second receiver to said time interval measuring means independent of and distinct from the signal from said first receiver.

9. In a well logging system of the type including transducers comprising a transmitter and first and second spaced receivers connected by an electric circuit to a time interval measuring means and in which first and second electric signals produced respectively by said first and second spaced receivers in response to the appearance of an acoustic pulse from the transmitter are applied to the time interval measuring means, and in which a circuit means operatively associated with said electric circuit and responsive to the appearance of the acoustic pulse at one of said transducers attenuates that portion of the electric signal from said first receiver following response by said circuit, the improvement comprising means connected with said second receiver for delaying transit of the second electric signal to said electric circuit for a time interval of predetermined length which length is greater than the time required for the actuation of said circuit means thereby to assure transmission of the second electric signal to said time interval measuring means independent of and distinct from the first electric signal.

References Cited in the file of this patent
UNITED STATES PATENTS

| | | |
|---|---|---|
| 2,436,503 | Cleveland | Feb. 24, 1948 |
| 2,704,364 | Summers | Mar. 15, 1955 |
| 2,708,485 | Vogel | May 17, 1955 |